(12) United States Patent
Timm

(10) Patent No.: US 12,258,237 B1
(45) Date of Patent: Mar. 25, 2025

(54) PIPE STRINGER ATTACHMENT FOR SKID STEER LOADER

(71) Applicant: Dennis Timm, Dodge Center, MN (US)

(72) Inventor: Dennis Timm, Dodge Center, MN (US)

( * ) Notice: Subject to any disclaimer, the term of this patent is extended or adjusted under 35 U.S.C. 154(b) by 328 days.

(21) Appl. No.: 17/213,338

(22) Filed: Mar. 26, 2021

(51) Int. Cl.
| | |
|---|---|
| *B65H 49/30* | (2006.01) |
| *B60P 3/035* | (2006.01) |
| *B65H 49/20* | (2006.01) |
| *B65H 49/32* | (2006.01) |

(52) U.S. Cl.
CPC ............ *B65H 49/305* (2013.01); *B60P 3/035* (2013.01); *B65H 49/205* (2013.01); *B65H 49/32* (2013.01); *B65H 2701/33* (2013.01)

(58) Field of Classification Search
CPC ...... B65H 49/205; B65H 49/28; B65H 49/30; B65H 49/305; B65H 49/32; B65H 75/403; B65H 75/42; B65H 2701/33
See application file for complete search history.

(56) References Cited

U.S. PATENT DOCUMENTS

| | | | | |
|---|---|---|---|---|
| 2,562,650 | A * | 7/1951 | Trunkhill | B65H 49/30 |
| | | | | 242/129 |
| 4,934,618 | A * | 6/1990 | Guignard | B65H 75/20 |
| | | | | 242/406 |
| 4,949,909 | A | 8/1990 | Hatfield | |
| 6,419,424 | B1 | 7/2002 | Null et al. | |
| 6,612,516 | B1 * | 9/2003 | Haines | B65H 54/70 |
| | | | | 254/326 |
| 7,997,523 | B1 | 8/2011 | Taugner | |
| 8,308,413 | B2 | 11/2012 | Ford | |
| 8,371,518 | B2 | 2/2013 | Factor | |
| 9,476,269 | B2 | 10/2016 | Dyck | |
| 10,117,386 | B1 | 11/2018 | Wilson | |
| 10,539,400 | B1 | 1/2020 | Nibert et al. | |
| 2002/0125362 | A1 * | 9/2002 | Bryant | B65H 49/28 |
| | | | | 242/129 |
| 2003/0108391 | A1 | 6/2003 | Essay | |
| 2005/0253015 | A1 | 11/2005 | Bohnisch | |
| 2019/0176319 | A1 * | 6/2019 | Wiltsey | B62B 1/208 |

\* cited by examiner

*Primary Examiner* — William A. Rivera
(74) *Attorney, Agent, or Firm* — Cramer Patent & Design, PLLC; Aaron R. Cramer

(57) ABSTRACT

The pipe stringer attachment may comprise a base plate, a spindle, a mounting coupler, and a frame. The pipe stringer attachment may be adapted to couple to a vehicle via the mounting coupler and may hold a payload on the base plate as the payload is dispensed to a work site during a pipe stringing operation. As a non-limiting example, the vehicle may be a skid loader. As non-limiting examples, the payload may be a coil of a flexible pipe or tubing such as a drainage pipe, a water line, a gas line, or a flexible conduit. As a non-limiting example, the work site may be a trench.

1 Claim, 8 Drawing Sheets

PIPE STRINGER ATTACHMENT FOR SKID STEER LOADER

RELATED APPLICATIONS

None.

FIELD OF THE INVENTION

The present invention relates generally to a pipe stringer and more specifically to pipe stringer attachment for a skid steer loader.

BACKGROUND OF THE INVENTION

Skid steer machines are very handy vehicles commonly used around farms, nurseries, and for general landscaping and maintenance. They are also often used in construction along with their close cousins, tractors and front-end loaders. Their small size and maneuverability allow them to operate in tight spaces. Their light weight allows them to be towed behind a full-size pickup truck, and the wide array of attachable accessories makes them very flexible. They are commonly used by landscapers to move landscaping and building materials, and a wide variety of other tasks.

However, one task that they are currently not equipped to perform is that of installing plastic underground piping such as in an open trench. Current installation methods typically rely on a truck or a truck pulled trailer that holds the reel as is it driven along the trench. Unfortunately, it is common for the truck and/or trailer to become stuck in the muddy and uneven terrain associated with trenches. Accordingly, there exists a need for a means by which a skid steer machine can be modified to allow for use during installation of plastic piping from a reel. The development of the Pipe Stringer Attachment for Skid Steer Loader fulfills this need.

SUMMARY OF THE INVENTION

In view of the foregoing disadvantages inherent in the prior art, it has been observed that there is need for a pipe stringer attachment which comprises a base which has a rigid horizontal planar frame assembly, a spindle upwardly projecting from a center of the base forming an axis which the payload revolves around, a frame coupled to an underside of the base and support the base, a mounting coupler adapted to couple the frame to a tow vehicle, a plurality of legs projecting downwards from the frame and a plurality of guides projecting upwards above the base. The base is operable to carry a payload such that the payload is uncoiled and deployed. The frame includes a lateral support armature and a longitudinal support armature. The legs elevate the base above ground level. The guides are operable to control uncoiling of the payload by retaining the payload on the base.

The base may be fabricated from an assembly of square tubular frame. The base may have a diameter that is larger than the diameter of the payload. The base rotates on the frame. A coil of a flexible pipe may be placed on the base, the spindle passes through the center of the coil. The spindle includes a pair of armatures that may be oriented in an inverted conical shape. The spindle includes the pair of armatures that may be oriented orthogonal to each other. The mounting coupler, the tow vehicle lifts the pipe stringer attachment and the payload by activating a lift arm of the tow vehicle. The mounting coupler may include a coupler plate with a substantially vertically oriented plate that couples to an attachment interface located at the front of the lift arm.

The coupler plate may couple to the attachment interface of the lift arm via mounting hardware passing through one or more mounting holes, one or more brackets, one or more rods, one or more interlocking elements, or any combinations. The coupler plate includes a lip. The lip may be an overhang along a top, rear edge of the coupler plate that is operable to interlock with a top edge of the attachment interface. The lateral support armature may pass laterally under a center of the base from a right edge of the base to a left edge of the base. The longitudinal support armature may pass longitudinally under the base. The legs may project downwards from the ends of the lateral support armature.

Each of the legs may include a wheel affixed to a distal end of each of the wheels. The length of the legs may match the mounting coupler such that when the pipe stringer attachment is decoupled from the tow vehicle, the base remains level as the legs and the mounting coupler rest on the ground. The pipe stringer attachment may be adapted to couple to the tow vehicle via the mounting coupler and hold the payload on the base as the payload is dispensed to a work site during a pipe stringing operation. The tow vehicle may be a skid loader. The tow vehicle may be an alternate tow vehicle with a hitch connection.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
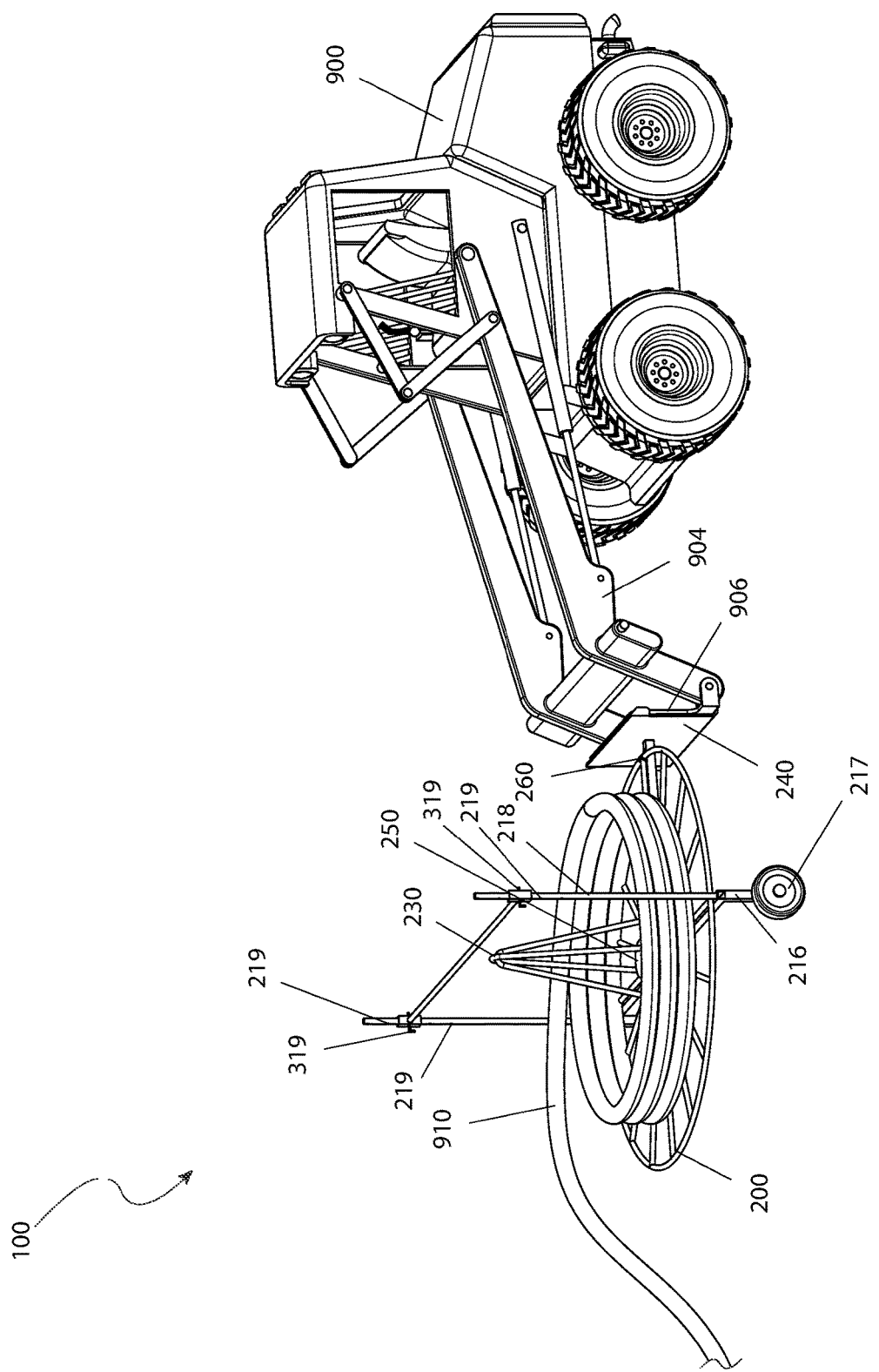
FIG. 1 is an isometric side in-use view of a pipe stringer attachment 100, according to an embodiment of the present invention.
Figure 2:
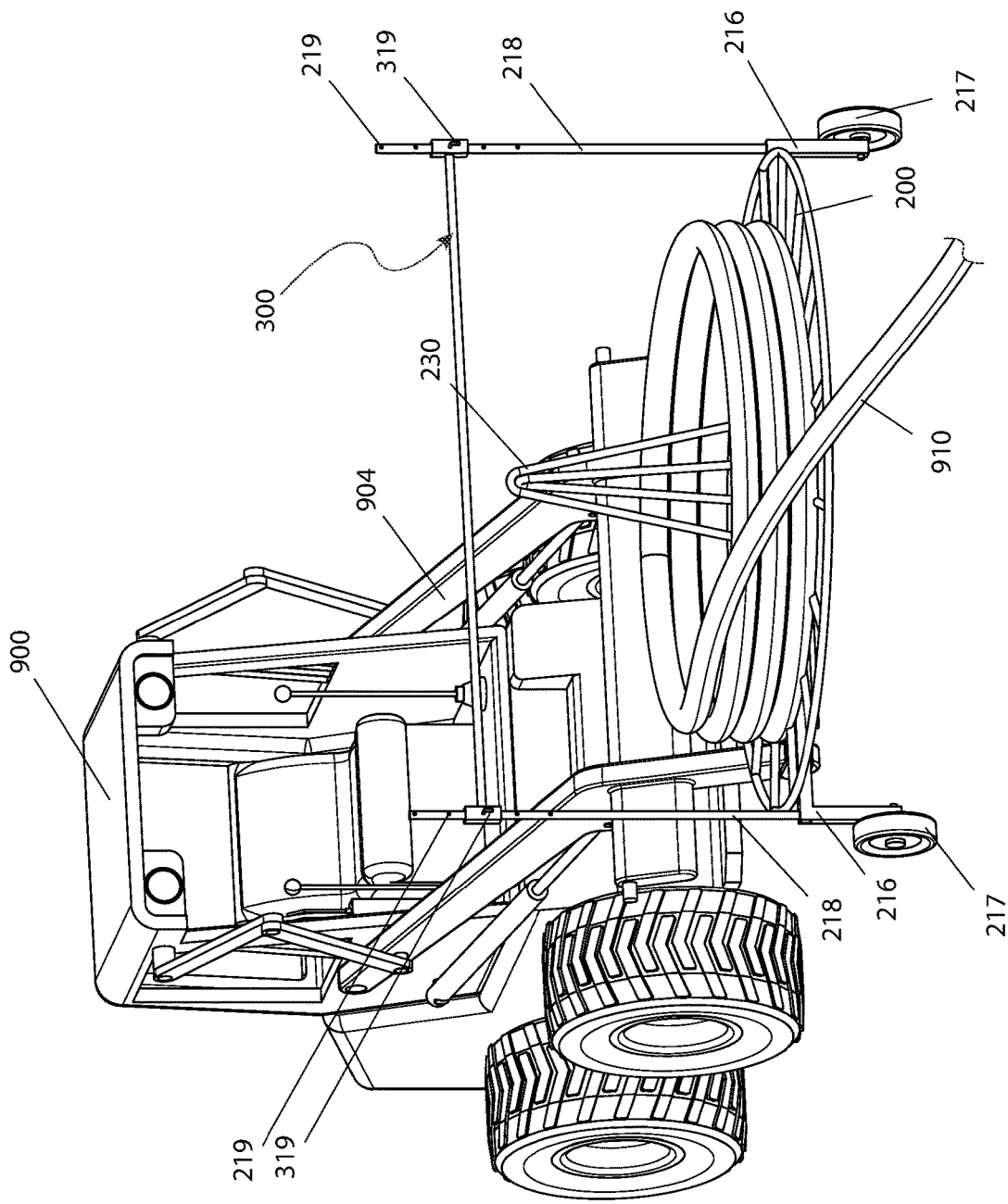
FIG. 2 is an isometric front in-use view of a pipe stringer attachment 100, according to an embodiment of the present invention.

DESCRIPTIVE KEY 100 pipe stringer attachment
200 base
202 center
210 frame
211 hitch arm
212 lateral support armature
213 hitch connection
214 longitudinal support armature 216 leg
217 wheel
218 guide
219 aperture
220 left side guide
222 right side guide
230 spindle
232 pair of armatures
240 mounting coupler
242 coupler plate
244 lip
250 hub
252 turntable axle
260 rotation lock
300 top bar assembly
310 top bar linear portion
315 top bar first connector end
319 pin
355 top bar second connector end
900 tow vehicle
902 alternate tow vehicle
904 lift arm
906 attachment interface
910 payload

DESCRIPTION OF THE INVENTION

Figure 3:
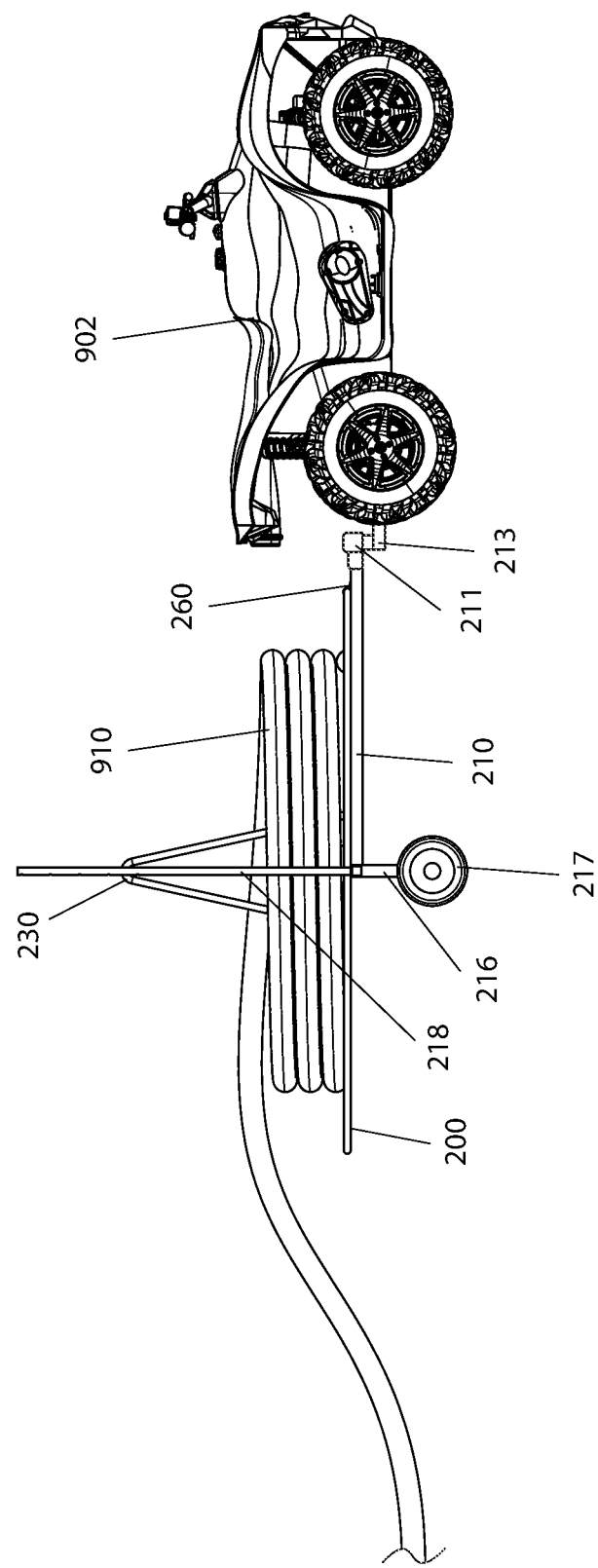
FIG. 3 is a side in-use view of a pipe stringer attachment 100, according to an embodiment of the present invention.
Figure 4:
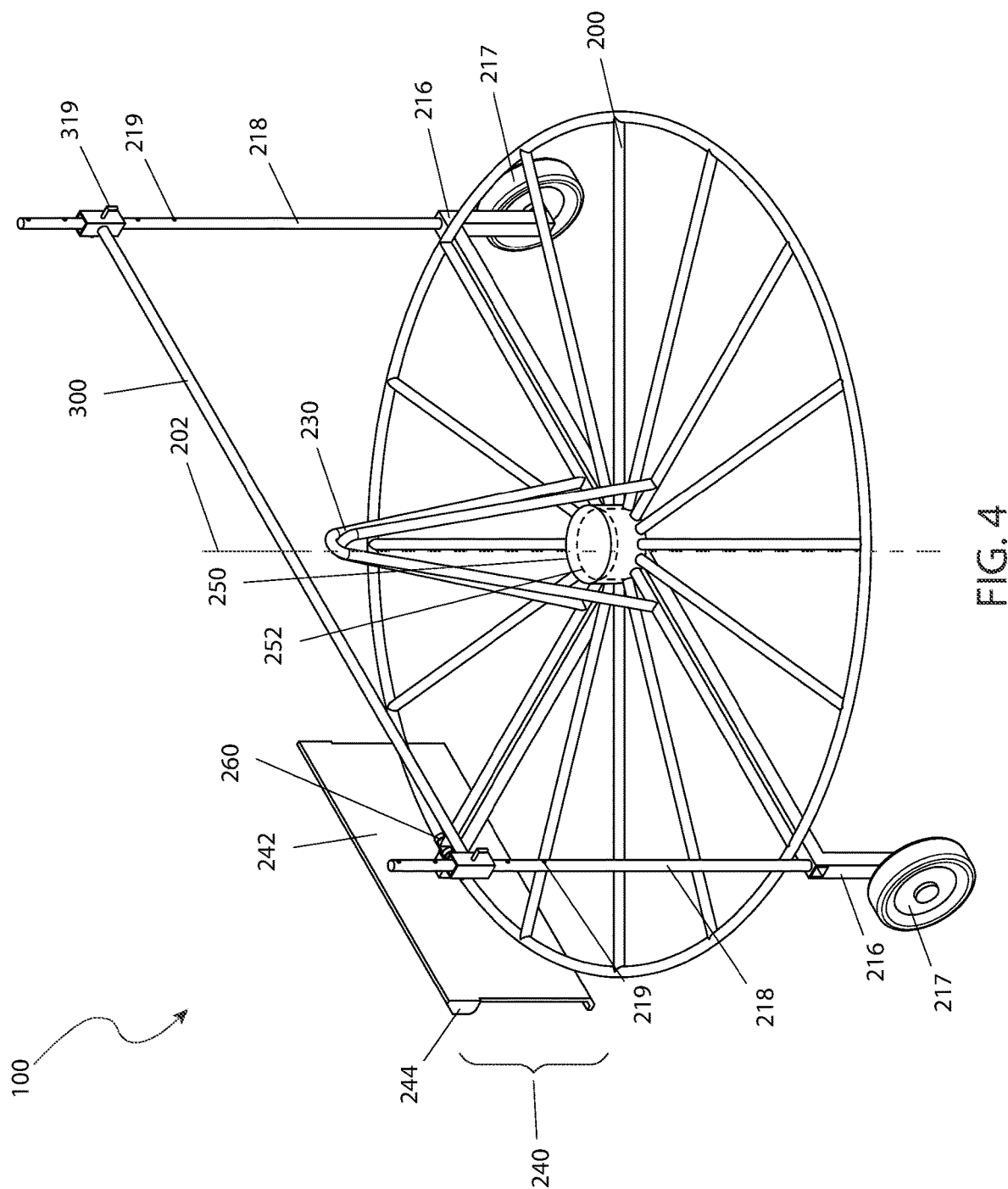
FIG. 4 is an isometric view of a pipe stringer attachment 100, according to an embodiment of the present invention.
Figure 5:
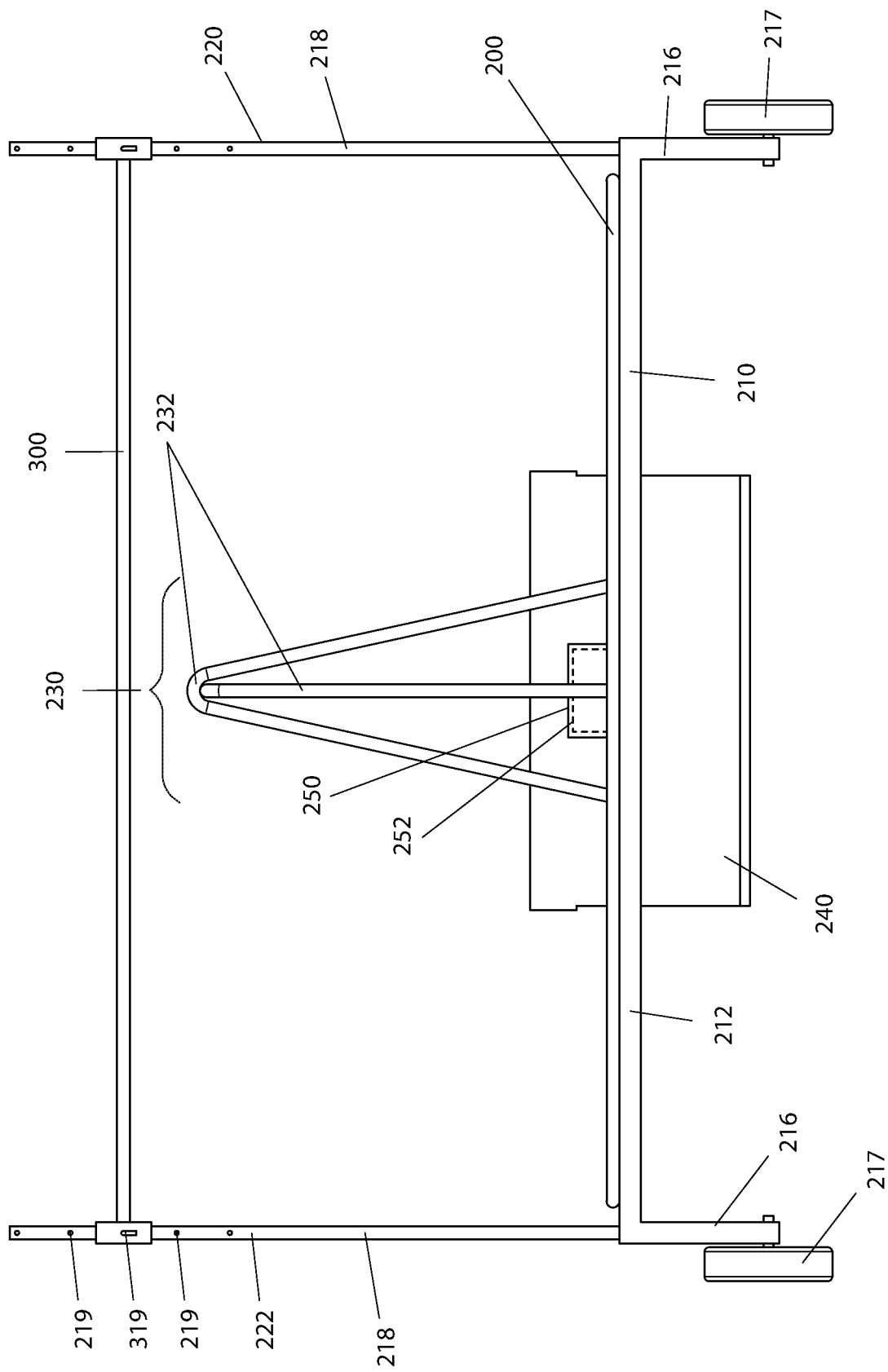
FIG. 5 is a front view of a pipe stringer attachment 100, according to an embodiment of the present invention.
Figure 6:
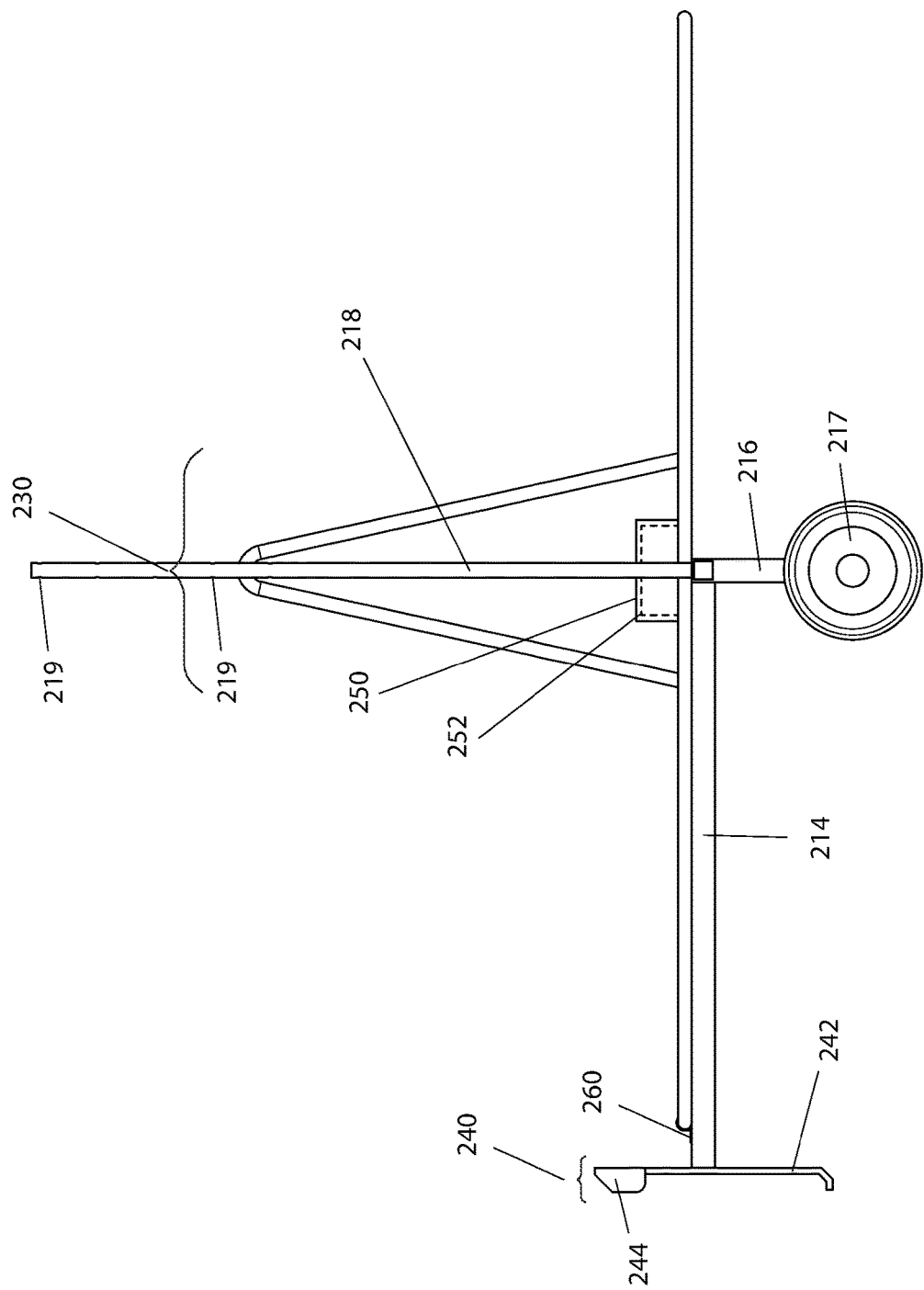
FIG. 6 is a side view of a pipe stringer attachment 100, according to an embodiment of the present invention.
Figure 7:
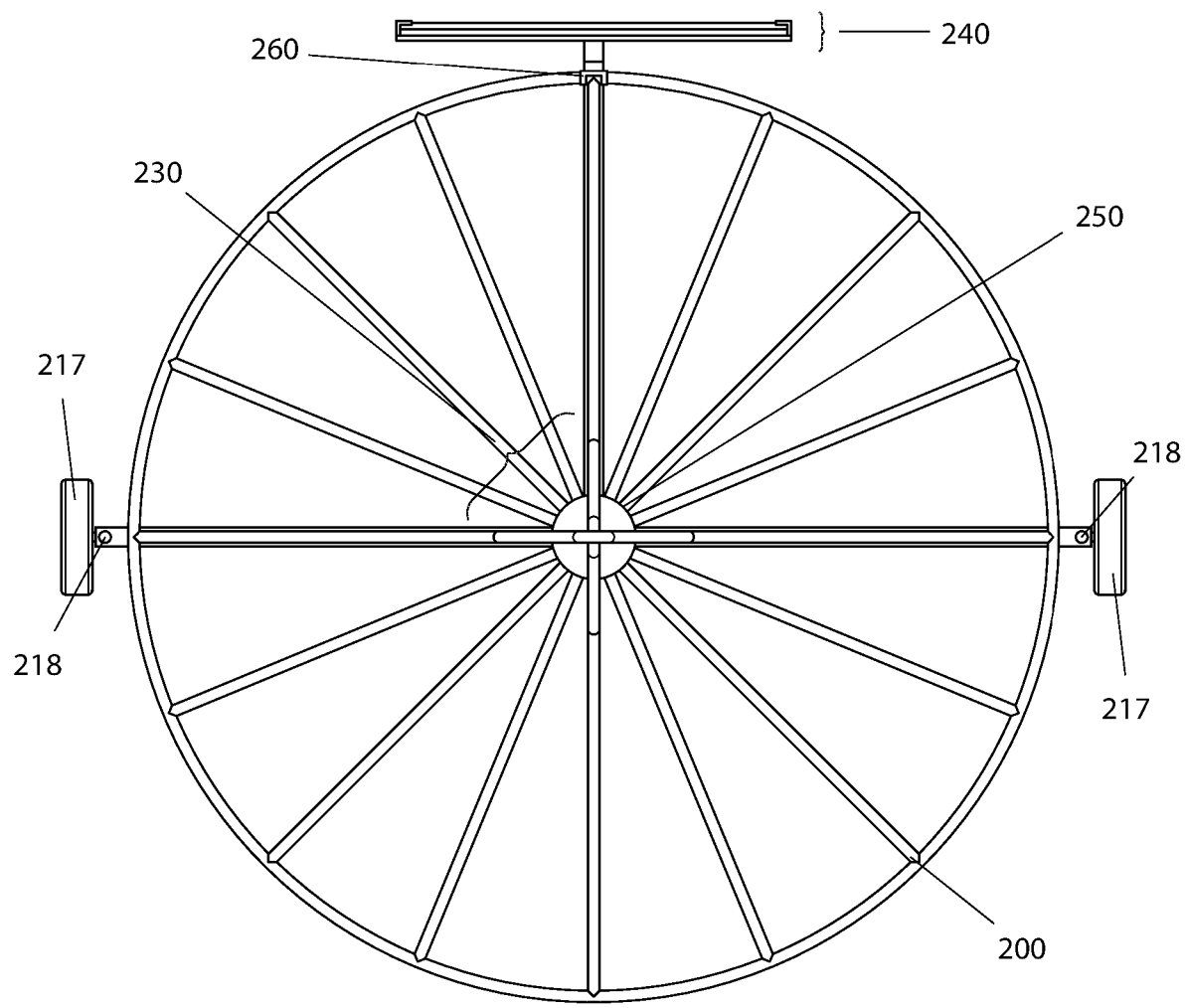
FIG. 7 is a top view of a pipe stringer attachment 100, according to an embodiment of the present invention.
Figure 8:
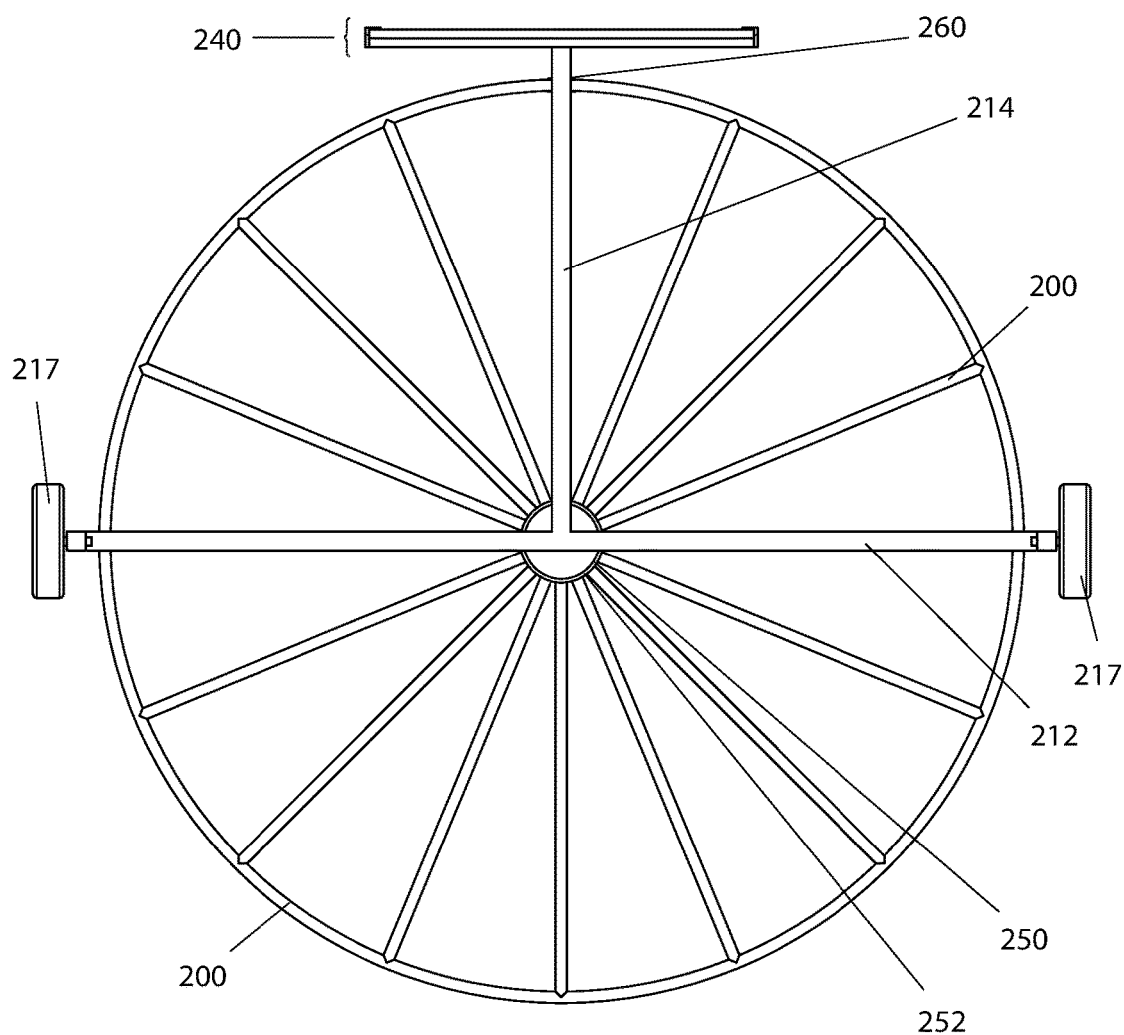
FIG. 8 is a bottom view of a pipe stringer attachment 100, according to an embodiment of the present invention; and, FIG. 9 is a perspective view of an adjustable top bar assembly 300, according to an embodiment of the present invention 10.
Figure 9:
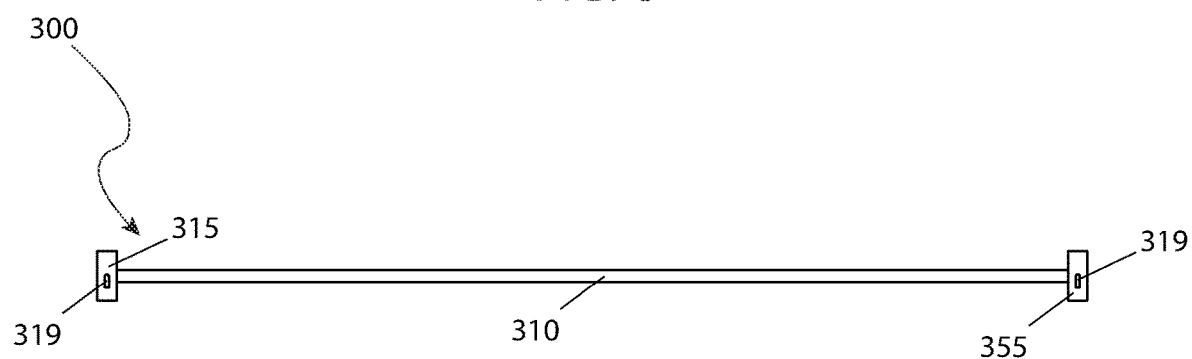

The present invention is directed to a pipe stringer attachment (herein described as the "invention") 100. The invention 100 may comprise a base 200, a spindle 230, a mounting coupler 240, and a frame 210. The invention 100 may be adapted to couple to a tow vehicle 900 via the mounting coupler 240 and may hold a payload 910 on the base 200 as the payload 910 is dispensed to a work site during a pipe stringing operation. As a non-limiting example, the tow vehicle 900 may be a skid loader. In other embodiments (see FIG. 3), an alternate tow vehicle 902 with a hitch connection 213 can be used. In this embodiment, a hitch arm 211 is capable of removable securing attachment to the hitch connection 213. As non-limiting examples, the payload 910 may be a coil of a flexible pipe or tubing such as a drainage pipe, a water line, a gas line, or a flexible conduit. As a non-limiting example, the work site may be a trench.

The base 200 may be a rigid horizontal planar frame assembly. In a preferred embodiment, the base 200 is fabricated from an assembly of square tubular frame elements to provide a lighter weight. Other embodiments may provide for a single plate. The base 200 may be operable to carry the payload 910 such that the payload 910 may be uncoiled and deployed. In some embodiments, the base 200 may be circular. The base 200 may have a diameter that is larger than the diameter of the payload 910.

The spindle 230 may be an upward projection from a center 202 of the base 200 forming an axis which the payload 910 may revolve around. When the coil of the flexible pipe is placed on the base 200, the spindle 230 may pass through the center of the coil. In some embodiments, the spindle 230 may comprise a pair of armatures 232 that are oriented in an inverted conical shape. Other shapes, such as an inverted truncated conical shape, or designs where the armatures 232 are orthogonal to each other are herein envisioned.

The mounting coupler 240 may couple the frame 210 to the tow vehicle 900. Using the mounting coupler 240, the tow vehicle 900 may lift the invention 100, and hence the payload 910, by activating a lift arm 904 of the tow vehicle 900.

The specifics of the mounting coupler 240 may vary based upon the tow vehicle 900. In some embodiments, the mounting coupler 240 may comprise a coupler plate 242. The coupler plate 242 may be a substantially vertically oriented plate and may couple to an attachment interface 906 located at the front of the lift arm 904. As non-limiting examples, the coupler plate 242 may couple to the attachment interface 906 of the lift arm 904 via mounting hardware passing through one (1) or more mounting holes, one (1) or more brackets, one (1) or more rods, one (1) or more interlocking elements, or combinations thereof.

In some embodiments, the coupler plate 242 may comprise a lip 244. The lip 244 may be an overhang along the top, rear edge of the coupler plate 242. The lip 244 may be operable to interlock with the top edge of the attachment interface 906.

The frame 210 may be coupled to the underside of the base 200 and may support the base 200. In some embodiments, the frame 210 may comprise a lateral support armature 212 and a longitudinal support armature 214. The lateral support armature 212 may pass laterally under the center 202 of the base 200 from the right edge of the base 200 to the left edge of the base 200. The longitudinal support armature 214 may pass longitudinally under the base 200. The longitudinal support armature 214 may extend rearwards past the rear edge of the base 200 to reach the mounting coupler 240. The rear end of the longitudinal support armature 214 may couple to the mounting coupler 240. The longitudinal support armature 214 may extend forward to at least the center 202 of the base 200.

The frame 210 may further comprise a plurality of legs 216 that may project downwards from the frame 210. The plurality of legs 216 may elevate the base 200 above ground level. In some embodiments, the plurality of legs 216 may project downwards from the ends of the lateral support armature 212. Affixed to the distal end of each leg 216 is a wheel 217. Each of the plurality of legs 216 may be identical in length. The length of the plurality of legs 216 may be selected to match the dimensions of the mounting coupler 240 such that when the invention 100 is decoupled from either tow vehicle 900, 902 the base 200 may remain level as the plurality of legs 216 and the mounting coupler 240 rest on the ground.

In some embodiments, the invention 100 may comprise a plurality of guides 218 that project upwards above the base 200. The plurality of guides 218 may be operable to control the uncoiling of the payload 910 by retaining the payload 910 on the base 200. The plurality of guides 218 may also be adapted to improve the operator's awareness of the position of the base 200 by providing elevated markers that are located at the perimeter the base 200 and are visible to the vehicle operator even if the base 200 is not visible to the operator of either tow vehicle 900, 902. In some embodiments, the plurality of guides 218 may comprise a left side guide 220 and a right side guide 222. The left side guide 220 may project upwards from the left end of the lateral support armature 212 and the right side guide 222 may project upwards from the right end of the lateral support armature 212 to mark the leftmost and rightmost extents of the base 200.

In some embodiments, the base 200 may rotate on the frame 210 in a turntable-like manner. As a non-limiting example, the base 200 may comprise a hub 250 and the frame may comprise a turntable axle 252. The hub 250 may comprise the center 202 of the base 200. The hub 250 may be a hollow cylindrical housing that is open on the bottom to accept insertion of the turntable axle 252 into the hub 250.

The turntable axle 252 may be a cylindrical projection upwards from the frame 210 where the lateral support armature 212 meets the longitudinal support armature 214. The outside diameter of the turntable axle 252 may be smaller than the inside diameter of the hub 250 such that the turntable axle 252 fits into the hub 250.

In some embodiments, the base 200 may be elevated above the frame 210 by the hub 250 and the turntable axle 252, except in cases where an imbalance of the payload 910 may cause the base 200 to tilt and touch the frame 210.

In some embodiments, the base 200, may ride on the frame 210 as the base 200 rotates. As a non-limiting example, the frame 210 may comprise Teflon bushings or similar friction reduction at locations where the base 200 and the frame 210 meet.

In some embodiments, a rotation lock 260 may prevent the base 200 from rotating when the invention 100 is being transported on the road. As a non-limiting example, the rotation lock 260 may be a pivoting forked hook that may be pivoted towards the base 200 to prevent rotation of the base 200 and may be pivoted away from the base 200 to allow rotation of the base 200.

In some embodiments, a top bar assembly 300 can be removably placed on top of the left side guide 220 and the right side guide 222 in order to prevent vertical travel of the payload 910 over the spindle 230 during transport or operation thereof. The top bar assembly 300 includes a tubular structure similar to the base 200 and spindle 230 individual elements. The top bar assembly 300 includes a top bar linear member 310, a top bar first connector end 315 located at a terminal first distal end of the top bar linear member 310, and a top bar second connector end 355 located at a terminal second distal end of the top bar linear member 310. The top bar first connector end 310 and the top bar second connector end 350 each are oriented perpendicular to the top bar linear portion 310 and each comprise an inner channel capable of sliding over the guides 218. The top car first connector end 315 and top bar second connector end 355 each has an aperture that is capable of secure attachment to an aligned pair of apertures 219 located in the guides 218 with a pin 319, thereby securing the top bar assembly 300 to the guides 218 and preventing unwanted travel of the payload 910 off the invention 100.

In use, the invention 100 may be coupled to a tow vehicle 900 by attaching a mounting coupler 240 of the invention 100 to an attachment interface 906 of a lift arm 904 on the tow vehicle 900; or alternately, the hitch arm 211 can be removably coupled to a hitch connection 213 of an alternate tow vehicle 902. A payload 910 may be placed onto a base 200. As a nonlimiting example, a coil of a flexible pipe may be laid on its side on the base 200 such that a spindle 230 passes vertically through the center of the coil. The chosen tow vehicle 900, 902 may be positioned adjacent a work site and the payload 910 may be pulled from the coil. As the payload 910 is deployed, the payload 910 may revolve around the spindle 230. The chosen tow vehicle 900, 902 may periodically be repositioned to move along the work site such that the payload 910 is deployed along the work site.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A pipe stringer attachment comprising:
   a base configured as a rigid horizontal planar frame assembly, operable to carry the payload such that the payload can be uncoiled and deployed, with a spindle projecting upward from the center of the base to form an axis around which the payload may revolve;
   a mounting coupler to couple the pipe stringer attachment to the tow vehicle, the mounting coupler including a coupler plate that can interlock with an attachment interface on the tow vehicle's lift arm, and wherein the coupler plate comprise a lip to further secure the connection;
   a frame coupled to the underside of the base to support the base, comprising a lateral support armature passing laterally under the center of the base and a longitudinal support armature extending longitudinally under the base and connecting to the mounting coupler;
   a plurality of legs projecting downward from the frame, each leg affixed with a wheel, configured to elevate the base above ground level and maintain level positioning when decoupled from the tow vehicle;
   a plurality of guides projecting upward from the base to control the uncoiling of the payload and provide visual markers for the vehicle operator, including a left side guide and a right side guide marking the lateral extents of the base;
   a top bar assembly that can be removably placed on top of the left side guide and the right side guide to prevent vertical travel of the payload over the spindle during transport or operation, the top bar assembly including a top bar linear member with connector ends that slide over the guides and secure with pins to prevent unwanted travel of the payload;
   a turntable mechanism allowing the base to rotate on the frame, including a hub at the center of the base and a turntable axle projecting upward from the frame, where the hub fits over the turntable axle to facilitate rotation, with friction reduction elements at contact points between the base and the frame; and,
   a rotation lock to prevent the base from rotating during transport, configured as a pivoting forked hook that can be engaged or disengaged with the base; and,
   wherein the pipe stringer attachment allows a tow vehicle to lift and transport a coil of flexible pipe or similar payload, and facilitates controlled uncoiling and deployment of the payload at a work site.

* * * * *